United States Patent [19]
Ibing et al.

[11] 3,865,696
[45] Feb. 11, 1975

[54] RECOVERY OF CITRACONIC ACID ANHYDRIDE BY ISOMERIZATION AND VACUUM DISTILLATION

[75] Inventors: Gunther Ibing, Gladbeck; Herbert Haferkorn, Buttrap, both of Germany

[73] Assignee: Veba-Chemie Aktiengesellschaft, Wanne Eickel, Germany

[22] Filed: Nov. 8, 1971

[21] Appl. No.: 196,731

Related U.S. Application Data

[63] Continuation of Ser. No. 842,180, July 16, 1969, abandoned.

[52] U.S. Cl. .................. 203/29, 203/15, 203/47, 203/78, 203/80, 260/346.8 R
[51] Int. Cl. .................. B01d 3/36, C07c 57/02
[58] Field of Search.......... 260/346.8 R; 203/28, 29, 203/15, 47, 80, 78

[56] References Cited
UNITED STATES PATENTS

| | | | |
|---|---|---|---|
| 2,966,498 | 12/1960 | Humphrey | 260/346.8 |
| 2,992,236 | 7/1961 | Bavley | 260/346.8 |
| 3,528,997 | 9/1970 | Justin et al. | 260/346.8 |

*Primary Examiner*—Wilbur L. Bascomb, Jr.
*Attorney, Agent, or Firm*—Burgess, Dinklage & Sprung

[57] ABSTRACT

Citraconic acid anhydride is recovered from an aqueous solution containing citraconic and maleic acids by first isomerizing the maleic acid and removing the resulting solid fumaric acid. The filtrate is vacuum distilled to remove 80 – 90 percent of the water at a sump temperature of less than 80°C. The concentrated solution is then further vacuum distilled at a sump temperature greater than 80°C, preferably greater than 100°C, and an anhydride/water mixture is recovered overhead from which the anhydride product is separated.

4 Claims, 1 Drawing Figure

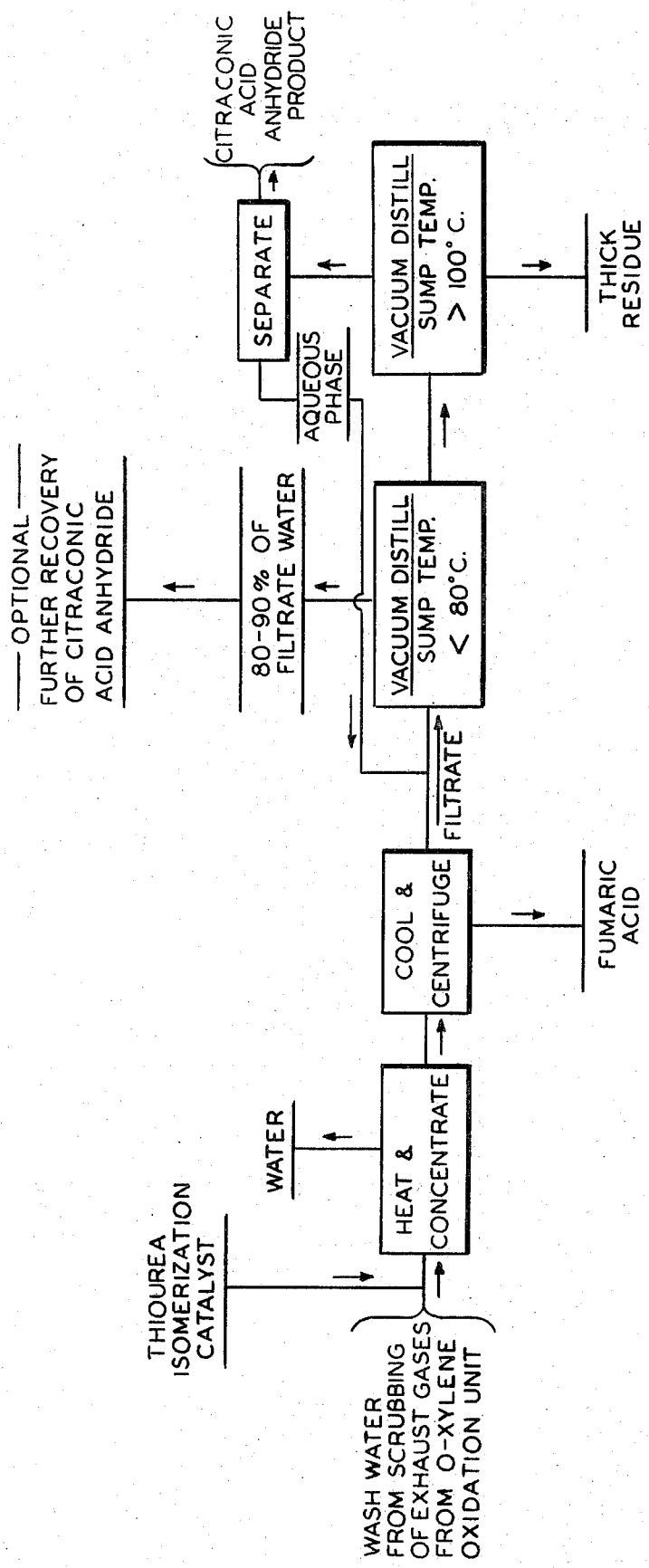

RECOVERY OF CITRACONIC ACID ANHYDRIDE BY ISOMERIZATION AND VACUUM DISTILLATION

This is a continuation of application Ser. No. 842,180 filed July 16, 1969 and now abandoned.

PREAMBLE

The invention relates to a method of recovering citraconic acid anhydride from wash waters from the washing of exhaust gases issuing from installations for the catalytic gas phase oxidation of alkyl aromatics and other hydrocarbons.

Citraconic acid anhydride is used as a dibasic acid component in the production of artificial resins, especially in the manufacture of laminated glass fiber material. It is also used as an anhydride hardener in the production of epoxy resins.

PRIOR ART

U.S. Pat. Nos. 2,966,498 and 2,992,236 isomerize itaconic acid by heating at reduced pressure with the simultaneous spliting off of water, to form citraconic acid anhydride. U.S. Pat. No. 2,719,853 obtains a mixture of maleic acid anhydride and citraconic acid anhydride from certain cracked petroleum fractions by catalytic gas phase oxidation, but the yields are poor.

It is known that in the catalytic gas phase oxidation of alkyl aromatics, such as xylenes, toluene, and cresols, over vanadium catalysts, citraconic acid anhydride is produced in small quantities. The oxidation of o-xylene is today performed for the production of phthalic acid anhydride on a large scale. Citraconic acid anhydride is a by-product which accumulates first as citraconic acid in dissolved form in the wash water which comes from the exhaust gas scrubber connected to the usual condensing apparatus, and in which it is accompanied by maleic acid and other components, of which some are acids. The ratio of citraconic acid to maleic acid varies between 1:10 and 1:20, according to the type of starting material and the type of catalyst used.

THIS INVENTION

The invention is directed to the problem of recovering citraconic acid anhydride on a large technical scale from such wash waters, which are produced in large quantities and therefore represent a very large source of the anhydride.

It has now been found that it is possible to recover citraconic acid anhydride directly from such wash waters. The easily soluble maleic acid, which is present in large quantities along with the citraconic acid, is initially transformed by isomerization to the sparingly soluble fumaric acid, and then the fumaric acid is separated. No structural change occurs in the easily soluble citraconic acid. The remaining solution is then concentrated by vacuum distillation, the sump temperature being kept below 80°C, until about 80 to 90 percent of the solution water has passed over. The remaining solution is finally subjected to a second vacuum distillation in which the sump temperature is raised to above 80°C, preferably to above 100°C, whereupon the citraconic acid anhydride distills over together with water and is thereafter separated from the water and recovered in pure form by further refining and/or rectification.

The transformation of the maleic acid to fumaric acid is preferably carried out in the presence of a catalyst, preferably thiourea or a mineral acid. It is suprising that the citraconic acid present in the solution is not isomerized to itaconic acid, while the maleic acid is transformed to fumaric acid.

In the second stage of the process, in which the filtrate from the fumaric acid separation is concentrated, it is important to maintain a certain sump temperature. A certain portion of the dissolved citraconic acid will anhydridize at around 100°C, and the citraconic acid anhydride thus formed is steam-volatile. It has been found that this anhydridization can be considerably suppressed by keeping the sump temperature below 80°C. The first vacuum distillation is therefore carried out under carefully controlled temperature conditions and only small amounts of citraconic acid anhydride pass over with the vapors. Upon condensation, they dissolve again and become hydrated. Thus, the losses that occur can be kept within narrow limits (about 1.5 g of citraconic acid per liter of condensate), while 80 to 90 percent of the solution water is distilled away. During this concentration process, an acid mixture precipitates in the sump, which can easily be separated. It has been found, however, that it is not necessary to separate these solids for the continuation of the process. The density of the concentrate, measured at 20°C, increases to about 1.2.

The third step of the present process is another vacuum distillation through a rectifying column. Here the rest of the solution water is distilled off, and the citraconic acid is anhydridized by gradually raising the sump temperature above 80°C, preferably to above 100°C, and the citraconic acid anhydride that has formed distils over together with the water. The citraconic acid anhydride and water can be condensed together, only a portion of the anhydride going into solution with hydration, while most of the citraconic acid anhydride separates as a second heavy phase and can be separated. The rest of the purification can be performed by normal refining and/or rectification techniques. The use of the distillation column prevents large amounts of contaminants from distilling over, particularly benzoic acid. The distillation residue is a thick, black mass which hardens upon cooling to room temperature.

The aqueous phase produced in the second vacuum distillation contains appreciable amounts of citraconic acid, which can be recovered if desired by subjecting the solution separately to a first and second vacuum distillation, as described. The aqueous distillate from the second vacuum distillation can, however, be fed back to the first vacuum distillation and be further processed together with the mother liquors of the maleic acid isomerization.

THE DRAWING

The drawing is a self-explanatory schematic illustrative of the process of this invention.

EXAMPLES

Example 1

In the exhaust gas scrubbing system of an o-xylene oxidation apparatus, the wash water is concentrated to such an extent that 280 g of maleic acid are present in each liter of solution. At the same time, citraconic acid concentrates to 15.5 g/l, for example (1 part citraconic acid to 18 parts maleic acid). 85 g of thiourea are added to 10 liters of this wash water, so that all of the maleic acid is isomerized to fumaric acid within a few hours with heating. After cooling, 3,040 g of moist crude fumaric acid (10.2 percent moisture) is separated by centrifugation. 6.9 liters of filtrate remain. The filtrate is subjected to a first vacuum distillation to remove the solution water. This is done under such conditions that the temperature of the still sump remains below 80°C. The filtrate is concentrated down to 980 ml (14 percent of the original volume). The acid mixture produced during the concentration is separated and washed with 50 ml of water. The filtrate is then subjected to a second vacuum distillation with the aid of a silvered rectification column containing, 10 theoretical trays. The heating is performed over an oil bath, which is heated up to 180°C in the course of the distillation. At first only an aqueous phase passes over; later on, citraconic acid anhydride occurs in the distillate as a second phase. The distillation is terminated when the temperature at the head of the column exceeds about 120°C at a pressure of 30 mm Hg. Then the heavy citraconic acid anhydride phase is separated from the aqueous phase (104.5 g). Analysis shows 93.1 percent citraconic acid anhydride, 72.8 percent of the theory.

A thick distillation residue remains, which hardens upon cooling to room temperature.

Example 2

The procedure is performed with the same starting material as in Example 1, but the separation of the acid mixture occurring during the first vacuum distillation is omitted. The second vacuum distillation immediately follows the first. 106.0 g of crude citraconic acid anhydride is obtained, having a purity of 92.5 percent. The yield amounts to 73.3 percent of the theory.

Example 3

The aqueous distillates from the second vacuum distillation of three charges are combined (1,650 ml) and concentrated in vacuo to 220 ml, the sump temperature remaining below 80°C. Then a second vacuum distillation is performed with a gradual increase in the sump temperature, Citraconic acid anhydride occurs in the distillate, as described in Example 1, along with an aqueous phase, and is separated.

In this manner, 43.6 g of citraconic acid anhydride is obtained having a purity of 98.1 percent.

We claim:

1. Process for recovering citraconic acid anhydride from an aqueous solution containing a mixture of citraconic and maleic acids consisting essentially of:
   a. isomerizing maleic acid in said solution to sparingly soluble fumaric acid and removing solid fumaric acid from the solution;
   b. removing water from the solution from (a) by vacuum distilling at a sump temperature of less than 80°C leaving a concentrated solution;
   c. removing a mixture of water and citraconic acid anhydride from the concentrated solution (b) by vacuum distilling at a sump temperature substantially greater than 80°C; and
   d. recovering citraconic acid anhydride from the mixture from (c).

2. Process of claim 1 wherein an isomerization catalyst is used in step (a) and the water remaining after recovery of citraconic acid anhydride in step (d) is recycled to step (b).

3. Process of claim 1 wherein the ratio of citraconic acid to maleic acid in said aqueous solution is in the range from 1:10 to 1:20.

4. Process of claim 1 wherein the sump temperature in step (c) is greater than 100°C.

* * * * *